United States Patent
Simmons

[19]
[11] Patent Number: 5,884,146
[45] Date of Patent: Mar. 16, 1999

[54] APPARATUS AND METHOD FOR ESTABLISHING A RADIO FREQUENCY COMMUNICATIONS LINK BETWEEN A CONTROLLER AND A REMOTE CONTROLLABLE SYSTEM

[75] Inventor: Jeffrey J. Simmons, Peoria, Ill.

[73] Assignee: Caterpillar Inc., Peoria, Ill.

[21] Appl. No.: 68,357

[22] Filed: May 27, 1993

[51] Int. Cl.$^6$ ...................................................... H04B 1/38
[52] U.S. Cl. .......................... 455/66; 455/575; 455/310; 375/222
[58] Field of Search ................................. 455/66, 78, 87, 455/88, 89, 38.3, 58.1, 73, 69, 70, 38.1, 507, 517, 527, 575, 310; 375/8, 222; 102/355

[56] References Cited

U.S. PATENT DOCUMENTS

| | | | |
|---|---|---|---|
| 4,665,519 | 5/1987 | Kirchner et al. | 375/8 |
| 4,788,543 | 11/1988 | Rubin | 455/58.1 |
| 4,852,122 | 7/1989 | Nelson et al. | 375/8 |
| 5,157,222 | 10/1992 | La Mura et al. | 102/360 |
| 5,231,273 | 7/1993 | Caswell et al. | 455/38.3 |
| 5,247,567 | 9/1993 | Hirano | 455/33.1 |

*Primary Examiner*—Thanh Cong Le
*Attorney, Agent, or Firm*—David M. Masterson

[57] ABSTRACT

A radio frequency data link that establishes communications between a controller and a remote controllable system is disclosed. The controller includes an interface device that produces command signals indicative of desired system functions. A transmitting RF modem receives the command signals and responsively generates radio frequency signals that are representative of the command signals. A remote controllable system includes a receiving RF modem that receives the radio frequency signals and responsively converts the signals into control signals. A logic device receives the control signals, performs the desired function, and produces a reply signal that indicates the status of the function.

5 Claims, 7 Drawing Sheets

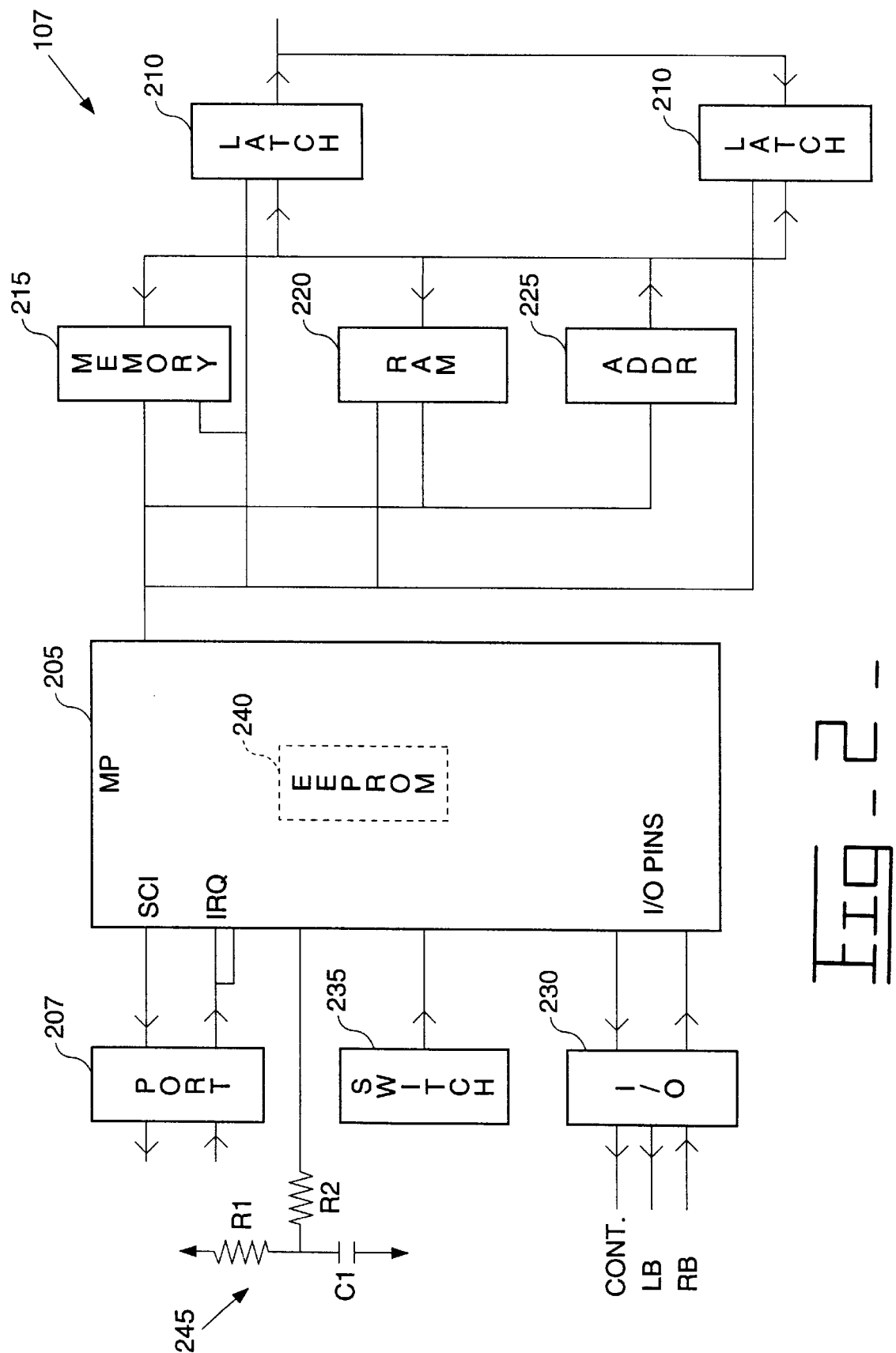

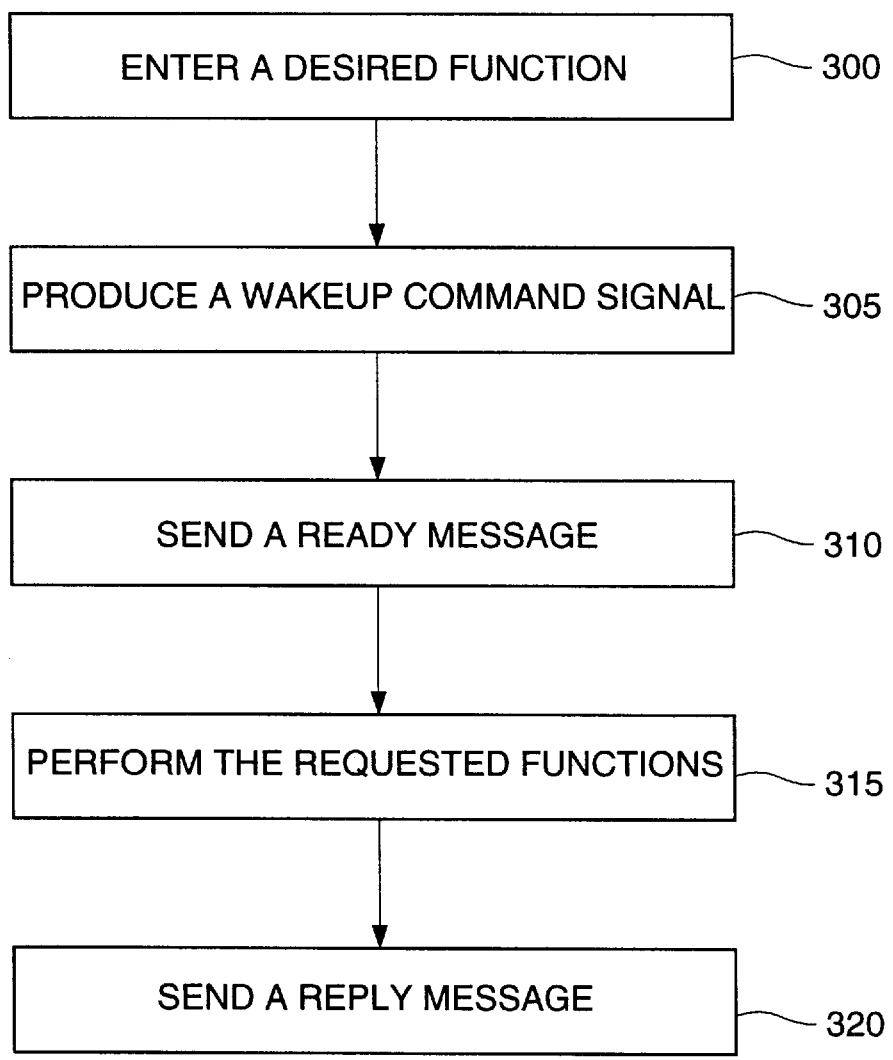

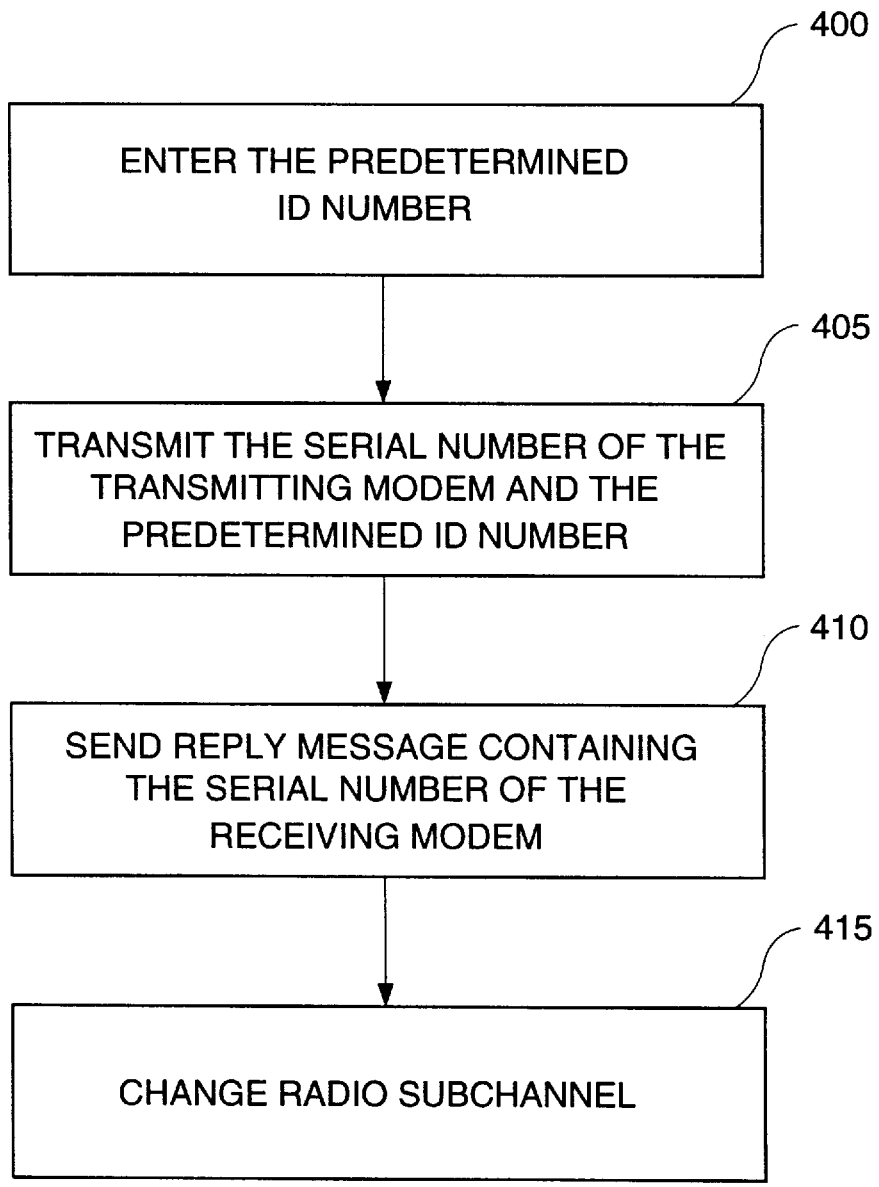

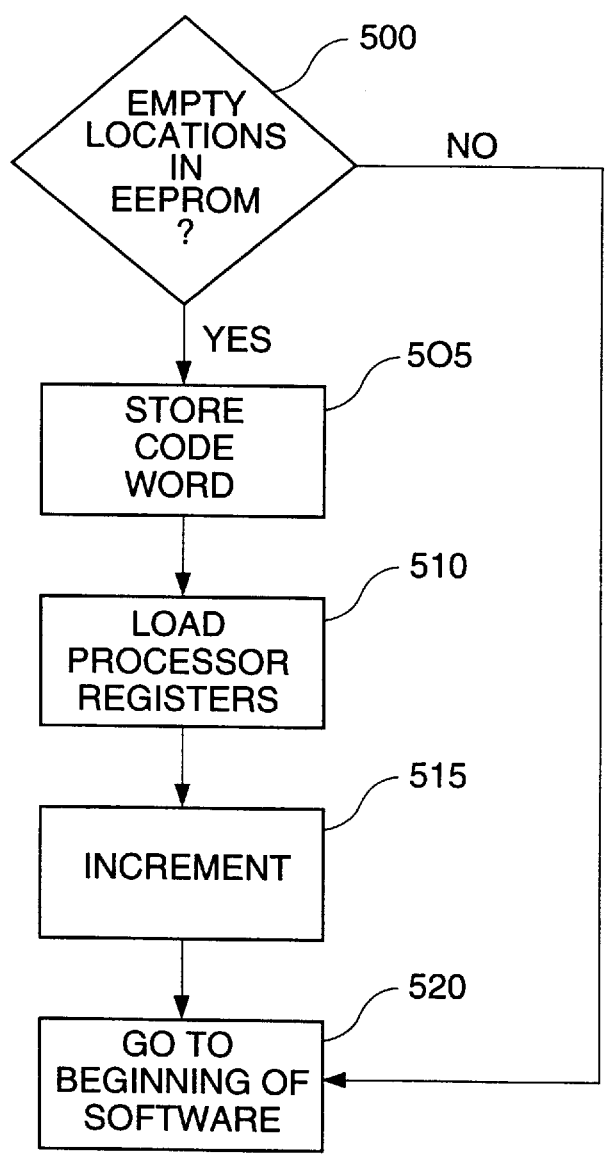

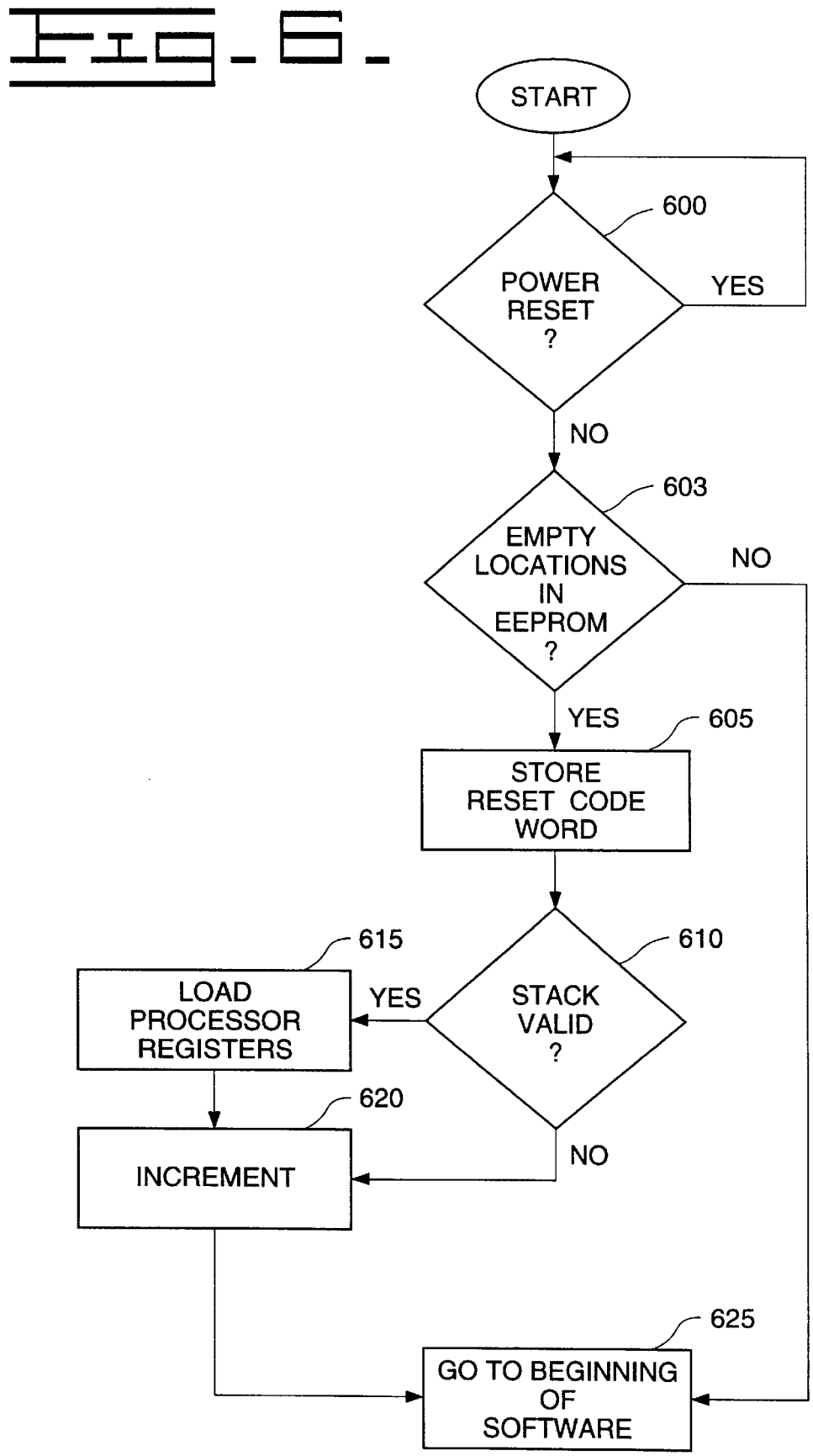
Fig_6.

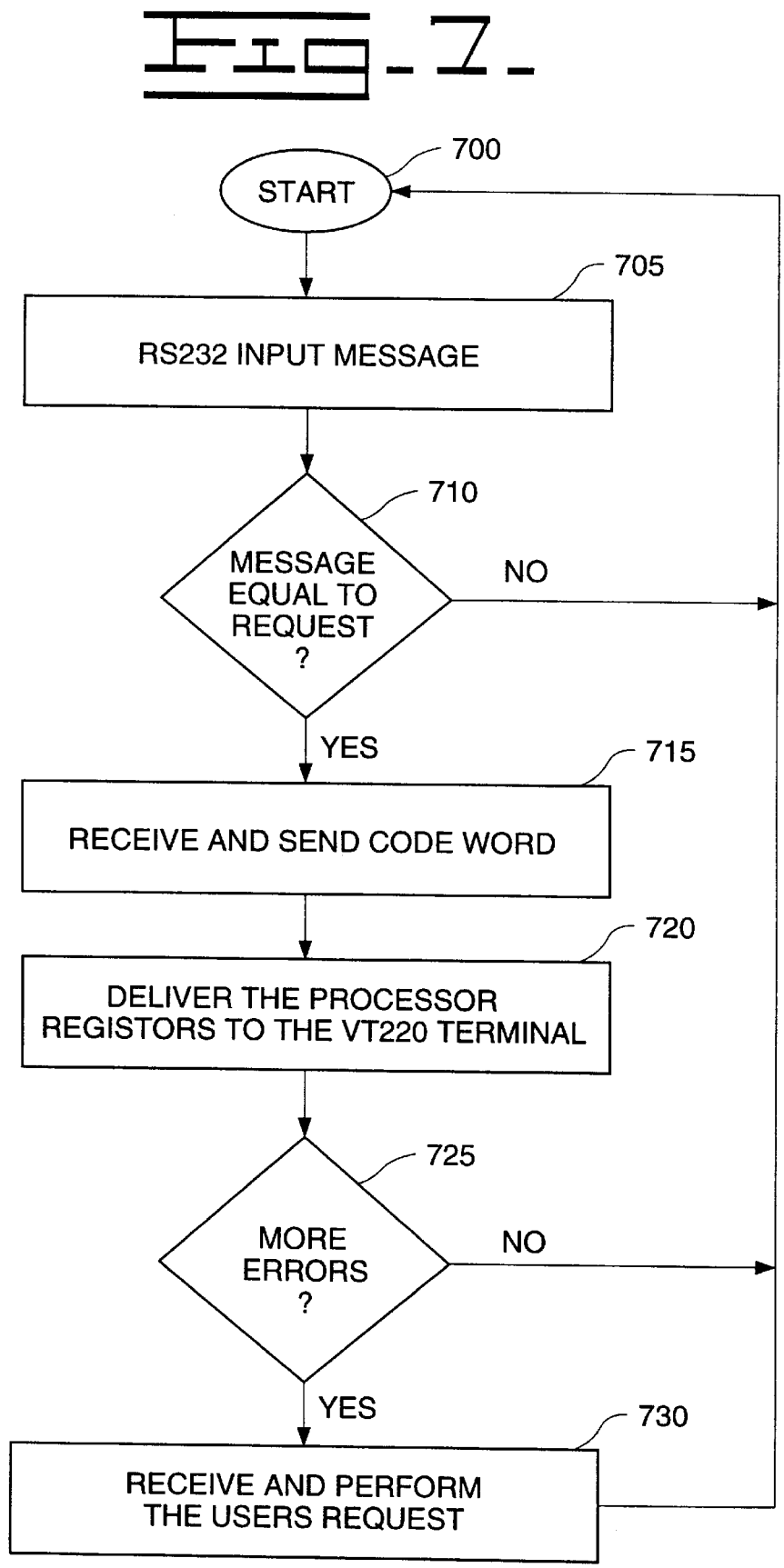

5,884,146

APPARATUS AND METHOD FOR ESTABLISHING A RADIO FREQUENCY COMMUNICATIONS LINK BETWEEN A CONTROLLER AND A REMOTE CONTROLLABLE SYSTEM

TECHNICAL FIELD

This invention relates generally to a radio frequency communications link apparatus and, more particularly, to a radio frequency communications link apparatus that controls remote systems.

BACKGROUND ART

Electromagnetic interference (EMI) that is introduced into remote controllable systems may cause poor system performance. This detrimental effect occurs because many of such systems combine high speed digital control circuitry with sensitive analog conditioning circuitry. Solutions that attempt to reduce EMI typically utilize hardware techniques, e.g. expensive filtering circuitry, multilayer PC boards, and intricate PC board layout. However each of these solutions adds cost to the system and may not effectively reduce EMI. Consequently many types of sensitive instrumentation that rely on such techniques may produce poor quality data.

Some remote controllable systems use radio frequency (RF) modems that operate using spread-spectrum radio frequencies. In other words, rather than operate at one discrete frequency, the RF modems use a band of frequencies enabling any one RF modem to communicate to any other RF modem. It is desirable, however, to use a single transmitter/receiver pair (point-to-point communication). Many of such modems use a message protocol that specifies the serial number of the receiving modem. While, this type of communication is useful, the user must have some means of determining the serial number of the modem pair—which may be difficult to accomplish.

Finally, system failures can be a source of problems with any type of system. The system may fail either through hardware or software errors. Due to the nature of these types of failures, they may occur on an infrequent or intermittent basis. The intermittent occurrence of the failures, makes identifying and solving the failures problematic.

Thus, a system is needed that can effectively reduce EMI, provide for point-to-point communications, and record system failures.

The present invention is directed to overcoming one or more of the problems as set forth above.

DISCLOSURE OF THE INVENTION

In one aspect of the present invention a radio frequency data link to establish communications between a controller and a remote controllable system is disclosed. The controller includes an interface device that produces command signals indicative of desired system functions. A transmitting RF modem receives the command signals and responsively generates radio frequency signals that are representative of the command signals. A remote controllable system includes a receiving RF modem that receives the radio frequency signals and responsively converts the signals into control signals. A logic device receives the control signals, performs the desired function, and produces a reply signal that indicates the status of the function.

BRIEF DESCRIPTION OF THE DRAWING

For a better understanding of the present invention, reference may be made to the accompanying drawings in which:

FIG. 2 shows a block diagram of an electrical circuit associated with the present invention;

FIG. 3 is a flowchart representing the software control associated with present invention to prevent electromagnetic interference;

FIG. 4 is a flowchart representing the software control associated with the present invention to achieve remote point-to-point communication;

FIG. 5 is a flowchart representing the software control associated with the present invention to record microprocessor failures produced by illegal interrupts;

FIG. 6 is a flowchart representing the software control associated with the present invention to record microprocessor failures produced by problem resets; and FIG. 7 is a flowchart representing the software control associated with the present invention to examine recorded microprocessor failure data.

BEST MODE FOR CARRYING OUT THE INVENTION

Figure 1:
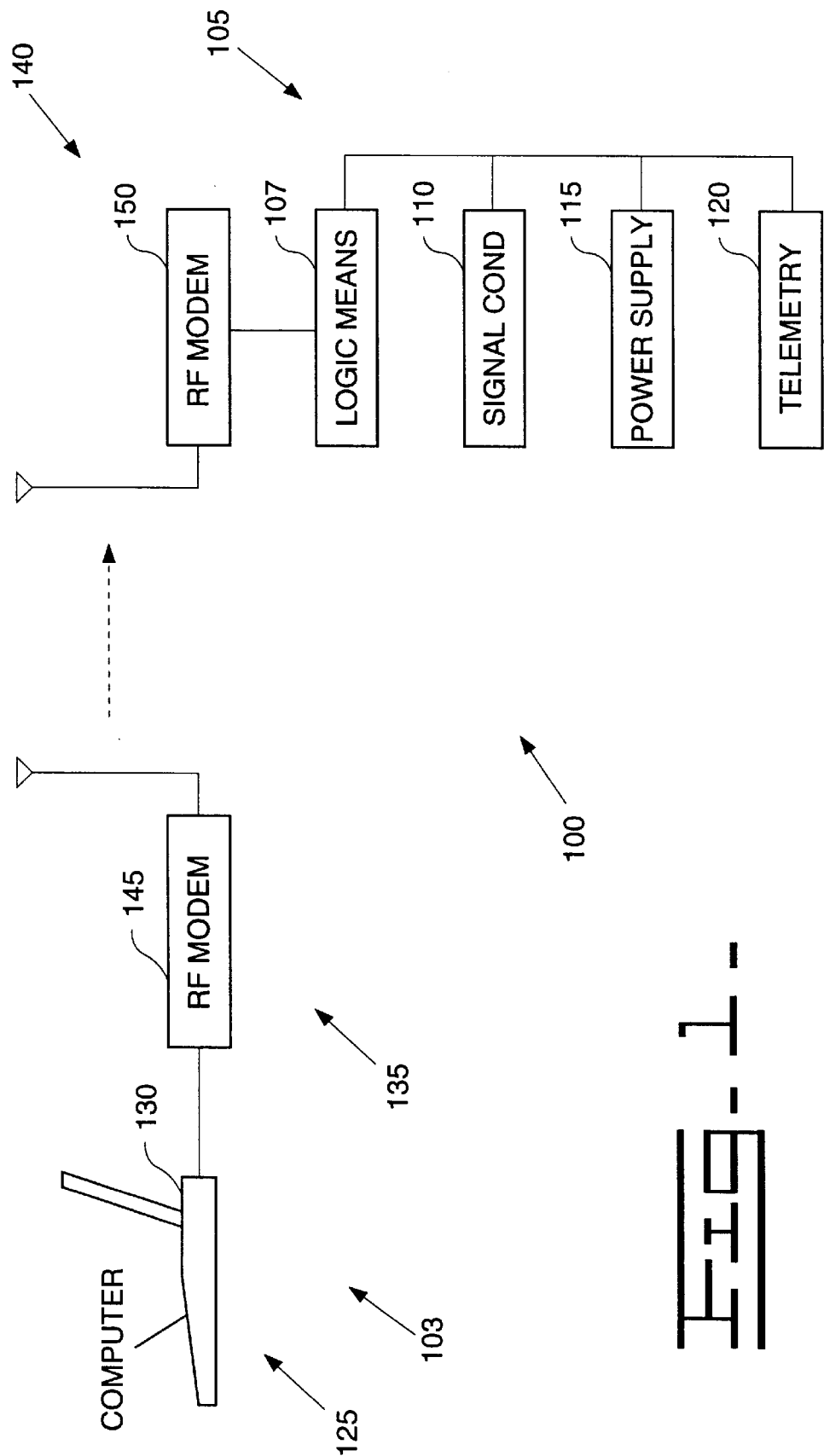
FIG. 1 shows a radio frequency data link that is associated with the present invention.

Referring now to the drawings, wherein a, preferred embodiment of the present invention is shown, FIG. 1 illustrates a radio frequency data link 100. For example, the data link 100 establishes communications between a controller 103 and a remote controllable system 105. As shown the remote controllable system 105 includes a logic means 107, a signal conditioning module 110, a power supply 115, and telemetry components 120. Although one such configuration is shown, those skilled in the art will recognize that the present invention may provide remote control capability to an unlimited number of remote controllable systems.

The controller 103 includes an interface means 125 that produces command signals that are indicative of desired system 105 functions. For example, a user may enter keystrokes to a laptop computer 130 to produce the desired command signals. A transmitting radio frequency (RF) means 135 receives the command signals and responsively generates radio frequency signals that are representative of the commands signals. A receiving RF means 140 receives the radio frequency signals and responsively converts the radio frequency signals into control signals. Preferably, the transmitting and receiving RF means 135,140 each include an RF modem 145,150. For example, a suitable RF modem is similar to that provided by Proxim of Mountain View, CA as model number MSP-100/2.

The logic means 107 receives the control signals, performs the desired function, and produces a reply signal indicating the status of the function. The logic means 107 is best described in relation to FIG. 2.

The circuit shown in FIG. 2 is exemplary, and the manner of design and construction of this, or a similar, circuit would be commonly known to a person skilled in the art.

Preferably, the logic means 107 includes a microprocessor 205. For example, the microprocessor 205 may be similar to that provided by Motorola, Inc. as model number 68HC11. The microprocessor 205 receives the control signal via an RS232 port 207, decodes the control signal, and performs the requested function by writing control data to the latches 210. For example, the latches 210 are connected to the data and address busses of the signal conditioning module 110. The microprocessor 205 also reads the values stored in the latches 210 to determine that the desired function is properly being performed. The logic means 107 also includes a program memory 215, RAM memory 220, and an address decoder 225. The microprocessor 205 may also write data to an I/O buffer 230 to control other modules.

The microprocessor 205 also includes a stop mode that prevents all the internal clocks from operating. Advantageously, the stop mode is used to prevent electromagnetic interference that is produced by the internal clocks of the microprocessor 205. The software control is shown in the flowchart of FIG. 3. Assume that the microprocessor 205 is normally in the stop mode. At the block 300, the user enters a desired function on the computer 130. At the block 305, the computer 130 produces a wakeup command signal to generate an external interrupt via the IRQ interrupt. The external interrupt cancels the stop mode to allow the microprocessor 205 to resume instructional processing. At the block 310, the microprocessor 205 sends a ready message to the computer 130. The ready message signifies that the microprocessor 205 may receive additional commands. Control then proceeds to the block 315, where the microprocessor 205 receives additional commands for performing the requested functions. The microprocessor 205 monitors the operation of the signal conditioning module 110 to determine that the desired function is being performed properly. As indicated by the block 320, the microprocessor 205 sends a reply message to the computer 130 indicating the status of the desired function. In response to producing the reply message, the microprocessor 205 reverts back to the stop mode. Accordingly the computer 130 displays the reply message to inform the user of the function's status.

The present invention also provides for point-to-point communications between the transmitting/receiving modem pair. Typically the controller 103 may communicate to several systems, where each system includes a receiving RF modem. Preferably all RF modems include a predetermined serial number. If the transmitting RF modem has the serial number of the receiving modem, then the transmitting/receiving modem pair can communicate directly to each other (point-to-point communications).

Adverting back to FIG. 2, the logic means 107 includes a rotary switch 235 that is selectable to a plurality of positions. Each switch position represents a predetermined ID number that identifies a corresponding logic means 107 (more importantly the ID number identifies a particular system). The switch 235 is instrumental in establishing point-to-point communications, as shown by the flowchart of FIG. 4.

At block 400, the user enters the predetermined ID number of the logic means 107 for the system that the user desires to control. Accordingly the computer 130 transmits a command signal to the plurality of systems via a broadcast communications mode. The command signal includes information representing the serial number of the transmitting RF modem and the predetermined ID number of the system to which the user wishes to establish communications—at block 405. Next, at block 410, the plurality of systems read the corresponding switch position. It is desired the transmitted switch position "match" the switch position of the requested system so that the system microprocessor 205 store the predetermined serial number of the transmitting modem and produce a reply message that includes the serial number of the corresponding receiving RF modem 150.

However, three scenarios may occur:

1. If the computer 130 does not receive a reply message, the command signals are re-transmitted.
2. If the computer 130 receives one reply message, the predetermined serial number of the transmitting modem is stored and the computer 130 sends a command signal confirming that the point-to-point communications link has been established.
3. If more than one reply is received, the computer prompts the user to change the switch position of the desired system and the process is repeated.

When the point-to-point communication link has been established, the transmitting/receiving RF modem pair each changes the subchannel of the respective modem operating frequency as shown in block 415. This effectively filters any new communication requests to secure the established communication link.

As shown in FIG. 2, the microprocessor 205 includes an EEPROM 240. Advantageously, the present invention writes data to the EEPROM in response to microprocessor processing failures. The failure data includes the type of microprocessor failure and program address of the processing failure. For example microprocessor failures may include processor resets, illegal opcodes, software clock timeouts, and illegal interrupts from on-chip peripherals.

The logic means 107 includes an RC circuit 245 to aid in distinguishing normal "power-on" resets from failure mode resets. As shown in FIG. 2, the RC circuit 245 includes resistors R1,R2 and a capacitor C1. During a normal power-on reset, the RC circuit 245 is not fully charged, and appears to the microprocessor 205 as a discharged state. However, the RC circuit 245 becomes fully charged shortly after "power-up". Thus when a reset failure occurs, the RC circuit 245 does not discharge and appears to the microprocessor 205 as a charged state. This enables the microprocessor 205 to distinguish between normal power-on reset operation and actual reset failures. Preferably the RC circuit 245 has a "large" time constant. For example the values of R1 and R2 may be 10.0 Mohms 3.57 Kohms, respectively, while C1 has a value of 1 micro Farad.

The software control treats illegal interrupts differently than failure mode resets. For example, shown in FIG. 5 is a flowchart of the illegal interrupt software control. Once an illegal interrupt occurs, the control first determines if any storage locations in the EEPROM 240 are available—shown by block 500. If so control then continues to block 505, where a code word is stored in the EEPROM 240. The code word identifies the type of interrupt. Next, at block 510, the information stored in the processor registers are loaded into the EEPROM 240. This provides for the program address of where the interrupt occurred to be identifiable. The control then increments to the next available address in the EEPROM 240, shown by block 515. At block 520, the control returns to the beginning of the software.

Shown in FIG. 6 is a flowchart that represents the failure mode reset software control. For example failure mode resets may include a power spike, an actuated reset button, or a hardware failure. At block 600 the control first determines if a "power-on reset" has occurred; if not, the control proceeds to block 603. At this block the control determines if any storage locations are available in the EEPROM 240. If storage locations are available, the control continues to block 605, where a code word is stored in the EEPROM 240. The code word identifies the type of failure mode reset. Next, at block 610, the control determines if the processor stack is valid. For example, power failures may corrupt the program memory rendering the processor register data unrecoverable. If the processor stack is valid, the control continues to block 615 where the contents of the processor registers are loaded into the EEPROM 240. At block 620, the control then increments to the next available location in the EEPROM 240. At block 625, the control returns to the beginning of the software.

Failure data can now be easily examined at the users convenience. To access the data, the user may connect a VT220 type terminal or the like to the RS232 port 207. Advantageously, the monitor software reads the contents of the EEPROM 240, and reformats and displays the data. Once the user is made aware of the type of processor failure, he then can remedy the failure(s).

The software control of the monitor program is shown in the flowchart of FIG. 7. Block 700 is the beginning of the control. At block 705, the control receives an RS232 input message that identifies the user's request. Next, at the block 710, the control determines if the input message is equal to the retrieval request. If so, control then continues to the block 715 to receive the code word from the EEPROM 240 and deliver the code word to the processor registers. At block 720, the control delivers the code word from the processor registers to the VT220 terminal. At block 725, the control determines if any other errors are stored in the EEPROM 240. If so, the control transfers to block 715; otherwise the control continues to block 730. Here, the user may quit the program and/or clear the EEPROM 240. The control performs the request and then transfers to the beginning of the program.

FIGS. 3 to 7 are flowcharts illustrating a computer software program for implementing the preferred embodiment of the present invention. The program depicted in these flowcharts is particularly well adapted for use with the microcomputer and associated components described above, although any suitable microcomputer may be utilized in practicing an embodiment of the present invention. These flowcharts constitute a complete and workable design of the preferred software program. The software program may be readily coded from these detailed flowcharts using the instruction set associated with this system, or may be coded with the instructions of any other suitable conventional microcomputer. The process of writing software code from flowcharts such as these is a mere mechanical step for one skilled in the art.

Industrial Applicability

As described, the present invention provides remote control capability to several types of systems. For example, a user may enter a series of commands via a computer 135. Responsively the computer 135 produces command signals that are delivered to a transmitting RF modem 145. The RF modem 145 transmits the command signals via radio to a receiving RF modem 150, which converts the signals to control signals. The logic means 107 decodes the control signals and performs the requested system function(s). A reply message is then transmitted back to the computer 135 to inform the user of the function's status.

The present invention is particularly suited to instrument systems that include high speed digital circuitry and sensitive analog circuitry. Much of the data produced by such systems is greatly effected by electromagnetic interference (EMI). As described above, the software control can not only reduce EMI, but can eliminate EMI while the instrument is producing or collecting data.

Moreover, the present invention provides for point-to-point communications to reduce communication error and provides for recordation of microprocessor failures to subsequently identify and solve system problems.

Other aspects, objects and advantages of the present invention can be obtained from a study of the drawings, the disclosure and the appended claims.

I claim:

1. A radio frequency data link to establish communications between a controller and a remote controllable system, comprising:

interface means for producing command signals indicative of desired system functions;

transmitting RF means for receiving the command signals and responsively generating radio frequency signals representative of the command signals, the transmitting RF means including an RF modem having a serial number;

a remote controllable system, including:

a switch being selectable to a plurality of positions, each switch position representing a predetermined ID number that identifies the remote controllable system;

receiving RF means for receiving the radio frequency signals and responsively converting the radio frequency signals into control signals, the receiving RF means including an RF modem having a serial number, wherein the radio frequency signals include information representing the serial number of the transmitting RF modem and the predetermined ID number associated with the receiving remote controllable system; and logic means for receiving the control signals, performing the desired function, and producing a reply signal that indicates the serial number of the receiving RF modem to establish point-to-point communication between the transmitting and receiving RF modem pair.

2. A radio frequency data link, as set forth in claim 1, wherein the microprocessor includes an EEPROM and including means for writing data to the EEPROM in response to microprocessor processing failures, the failure data including the type of microprocessor failure and program address of the processing failure.

3. A radio frequency data link, as set forth in claim 2, including means for reading the failure data that is stored in the EEPROM.

4. A radio frequency data link, as set forth in claim 1, wherein the remote controllable system includes a microprocessor, whereby the microprocessor internal clocks are stopped to reduce electromagnetic interference in response to the reply signal.

5. A radio frequency data link, as set forth claim 4, wherein one of the command signals includes a wakeup command signal, the wakeup command signal causing an external interrupt to be delivered to the microprocessor to start the microprocessor internal clocks to allow the microprocessor to perform the desired function.

* * * * *